Oct. 7, 1941.　　M. RESEK ET AL　　2,257,813
LIQUID FUEL STOVE
Filed Nov. 21, 1939　　7 Sheets-Sheet 1

INVENTORS.
MARC RESEK
JOHN A. DAHLSTROM
BY Hull, Brock + West
ATTORNEYS.

Fig. 3.

Oct. 7, 1941.  M. RESEK ET AL  2,257,813
LIQUID FUEL STOVE
Filed Nov. 21, 1939   7 Sheets-Sheet 4

INVENTORS.
MARC RESEK
JOHN A. DAHLSTROM
BY Hull, Brock & West
ATTORNEYS.

Oct. 7, 1941.　　　M. RESEK ET AL　　　2,257,813
LIQUID FUEL STOVE
Filed Nov. 21, 1939　　　7 Sheets-Sheet 6

INVENTORS.
MARC RESEK
JOHN A. DAHLSTROM
BY Hull, Brock & West
ATTORNEYS.

Oct. 7, 1941.   M. RESEK ET AL   2,257,813
LIQUID FUEL STOVE
Filed Nov. 21, 1939   7 Sheets-Sheet 7

INVENTORS.
MARC RESEK
JOHN A. DAHLSTROM
BY Hull, Brock & West
ATTORNEYS.

Patented Oct. 7, 1941

2,257,813

UNITED STATES PATENT OFFICE

2,257,813
LIQUID FUEL STOVE

Marc Resek, Cleveland Heights, and John A. Dahlstrom, Bay Village, Ohio, assignors to Perfection Stove Company, Cleveland, Ohio, a corporation of Ohio Application November 21, 1939, Serial No. 305,506

27 Claims. (Cl. 126—44)

This invention relates to improvements in liquid fuel stoves, particularly of the kind shown in Letters Patent No. 1,138,536, dated May 4, 1915, and No. 2,068,122, dated January 19, 1937.

With the trend toward modern design, especially in the direction of enclosed or "console" type stoves, the problem has developed as to where best to locate the fuel reservoir so as to conceal it under normal conditions and yet maintain it relatively cool and convenient of access; so as not to unduly lengthen the stove; so that the portable reservoir will not be too directly exposed to the burners when being removed and replaced and thereby create a fire hazard, and so that the stove may be located near side walls or other objects without refueling being interfered with or rendered inconvenient.

In each of the patents above identified, the portable fuel reservoir is housed in a compartment below the stove top adjacent an end wall and well beyond the region of the burners. This arrangement necessitated the stove frame being lengthened over what otherwise would have been necessary by the full width of the compartment; and it was essential that the compartment be relatively spacious in order to provide ample ventilation. In the earlier of said patents the reservoir compartment opens through the front of the stove, while in the latter it opens through the top.

Prior attempts other than those exemplified by said patents have been made to house the reservoir within the stove frame, including one in which the reservoir was lowered through an opening in the top in such relation to the burners as to cause danger of fire when refueling during operation of the burners. To preclude fuel replenishment at such time, however, would often result in great inconvenience and likelihood of spoiling articles of food in the process of cooking.

An important object of the present invention is to minimize the over-all length of stoves of the class in question by utilizing what has heretofore been waste space as the location for the fuel reservoir.

In a more limited aspect of the invention it has to do with a type of stove that incorporates a plurality of burners arranged side by side with their axes in a plane parallel to and near the front of the stove and in the required spaced relation to and below the stove top; and the invention has as a prime object, to locate the reservoir compartment in a space to the rear of said burners and incidentally alongside a burner, or between burners, situated to the rear of the former burners in staggered relation thereto, this arrangement of burners being common in stoves of the class in question. The burner space is desirably closed at the front by a door that is hinged at its lower edge to the stove frame and swings down, in certain embodiments of the invention, to a horizontal position. According to the invention, the reservoir compartment, set off by walls that shield its interior from the heat thrown off by the burners, is provided with a relatively narrow front opening, the same being of a width slightly greater than that of the portable reservoir and so disposed as to provide the necessary clearance between the reservoir and adjacent burner or burners; and the invention provides, in combination with such a structure as that just described, means by which the reservoir is received in an upright position adjacent the front of the stove and by which it is supported and guided during rearward movement beneath the stove top, in a substantially horizontal direction, and with an end-over-end or rolling action, through the front opening, into the compartment to an inverted position over a fuel basin that has communicative connection with the burners and into which the reservoir discharges and wherein it is liquid sealed.

Another object is to provide a combined guide and support for the reservoir that folds into compact form when not in use and is adapted to be conveniently extended when the reservoir is to be removed or replaced. Desirably this collapsible structure is biased toward both extreme positions from an intermediate point in its range of movement; and a further object is to so relate the structure to the aforesaid door that when the door is swung toward closed position, said structure, if not previously collapsed, will automatically assume folded condition. The guide and support, when folded or collapsed, serves as a closure for the front opening of the reservoir compartment, and being of juxtaposed sections when in such condition, provides a double wall that shields the reservoir from the heat reflected rearwardly by the aforesaid door when the latter is closed. It is especially due to the fact that the stove is of the enclosed or so-called "console" type that protection of the reservoir from the heat of the burners is highly important, and to a furtherance of this end the compartment is thoroughly ventilated, as will hereinafter more fully appear.

Convenience of refueling; absence of fire hazard during replenishment of the fuel supply; freedom from oil drippage; and relative simplicity of construction and reliability of operation are among the further and more general objects of the invention, all of which will be apparent from the following description in the course of which reference is made to the accompanying drawings that form a part hereof and wherein several embodiments of the invention are illustrated.

The frame of the stove, which may be of any approved construction (and with reference particularly to Figs. 1 to 5) includes a top 1; ends 2 and 3; a back panel 4 that depends from the rear edge of the top and extends from one of said ends to the other; an oven 5 that, in the present design, is mounted on the right hand end of the stove top; and a cabinet back 6 that rises from the rear edge of the top and extends from the oven to the end of the top remote therefrom.

Figure 1:
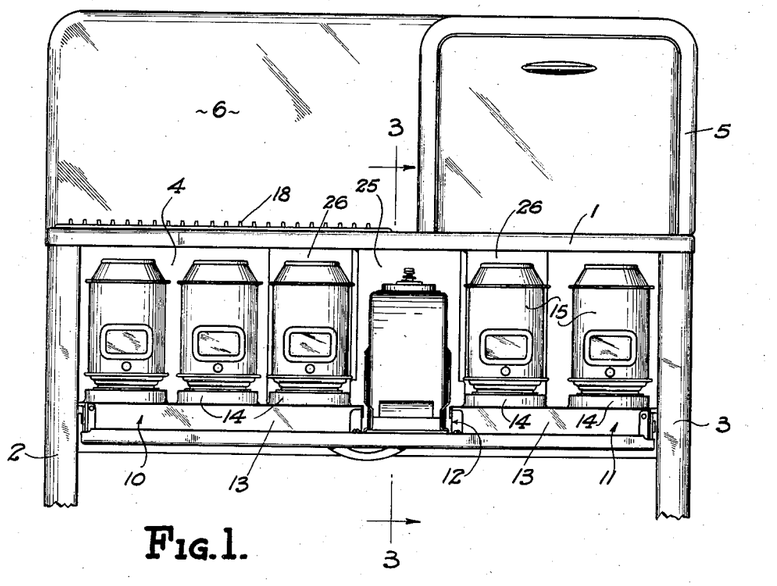
Fig. 1 is a fragmentary front elevation of a liquid fuel stove embodying the invention, the same being shown with the door that normally closes the space occupied by the burners and fuel reservoir in open position and the collapsible guide and support for the reservoir in extended condition.
Figure 2:
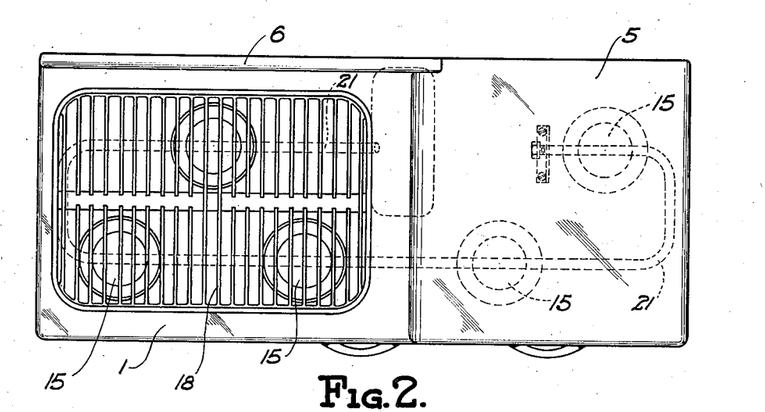
Fig. 2 is a plan view of the stove with the fuel basin and the conduit through which it has communicative connection with the burners shown in dotted lines.
Figure 3:
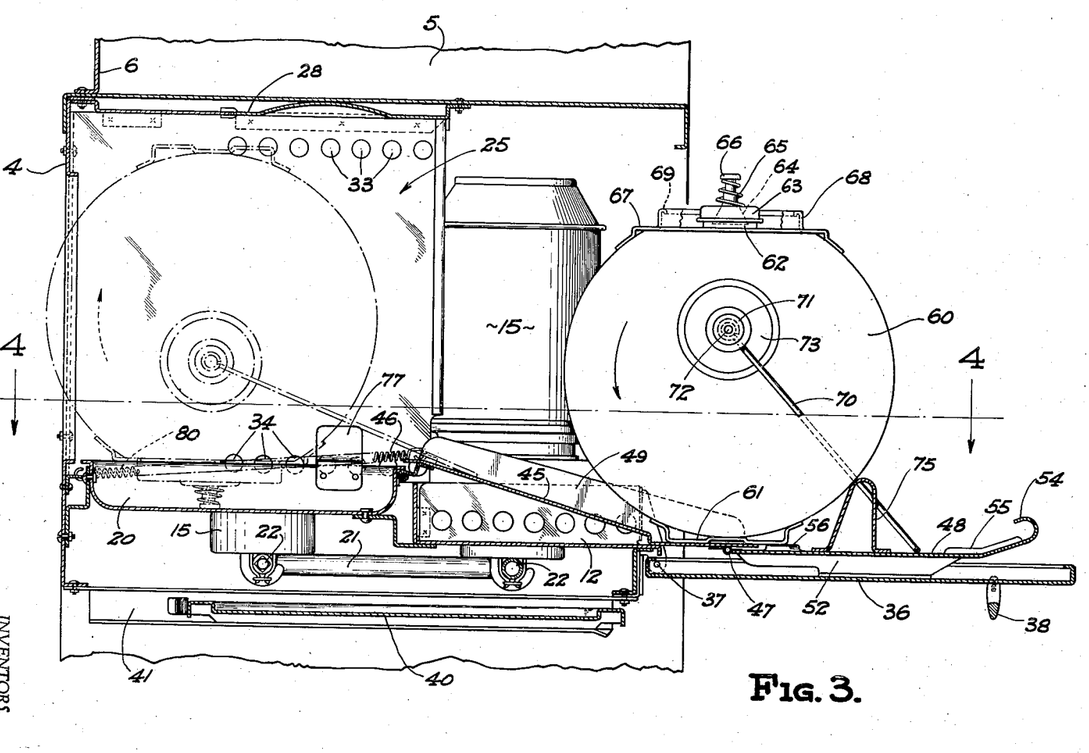
Fig. 3 is a vertical section through the stove substantially on the line 3—3 of Fig. 1 and on a scale considerably larger than that of the former views.
Figure 4:
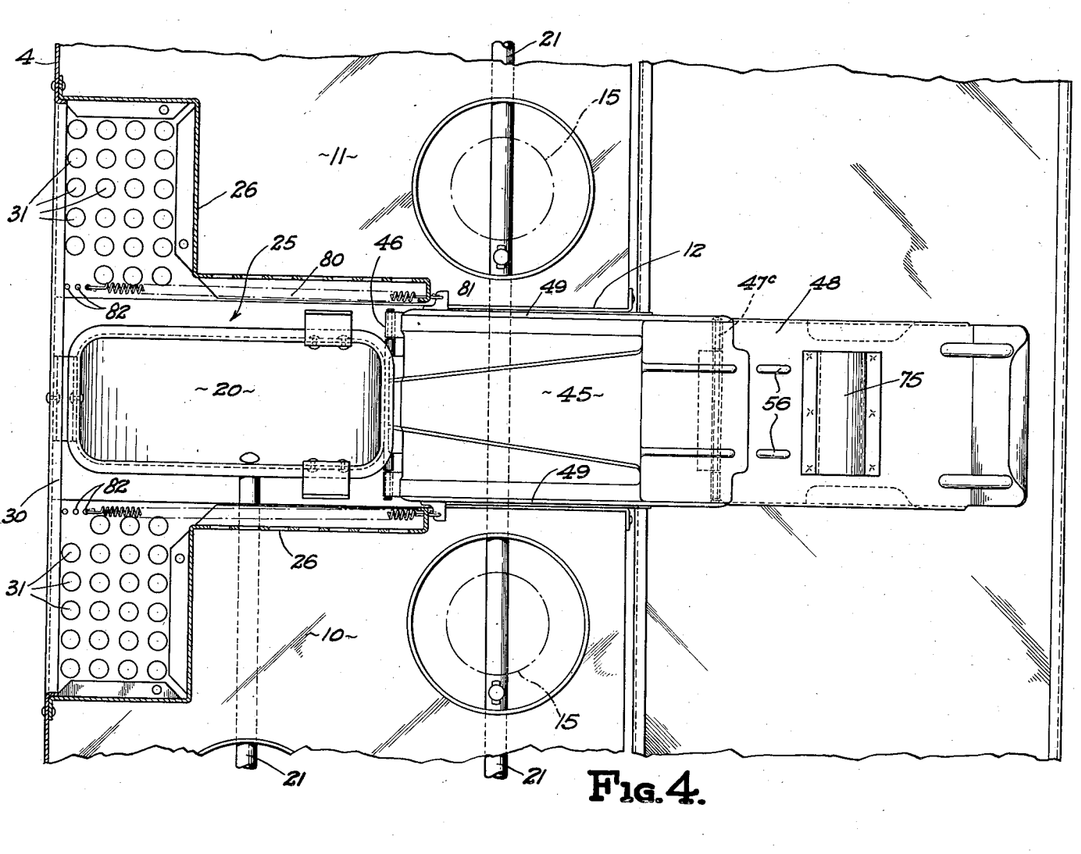
Fig. 4 is a horizontal section substantially on the line 4—4 of Fig. 3 with the portable reservoir omitted.

Spaced a distance below the top 1 in a plane parallel thereto, and suitably attached to and thus supported by the ends 2 and 3 and the rear panel 4, is an assembly made up of what may be termed burner plates 10 and 11 and a box like member 12. The burner plates 10 and 11 are rectangular in plan; have depending flanges 13 along their forward edges, and are provided with burner openings that are surrounded by upstanding flanges 14. The burner plates are spaced apart a substantial distance by the member 12, as best shown in Figs. 1 and 4, and said member being open at the top and front provides a depression for the accommodation of the collapsible reservoir guide and support when the latter is in extended condition, as shown in Figs. 1, 3 and 4, and as will more fully appear hereinafter. The term "guide and support" is used in the singular sense as referring to a composite unit.

The burners, including the usual drums or chimneys, are designated generally by the reference numeral 15, and, according to the arrangement shown, three of the burners are aligned along the front of the stove, and two to the rear of and in staggered relation to those at the front. The two left hand front burners and the one to the rear of the space therebetween are situated below an opening in the stove top that is equipped with a grid 18. These burners, by reason of their purpose, may be termed cooking burners, while the others, located near the right hand end of the stove, for a similar reason, may be termed oven burners.

Located rearwardly of the member 12 in an open space between the burner plates 10 and 11 is a fuel basin 20. The basin has communicative connection with all burners through a pipe or conduit 21, shown in dotted lines in Fig. 2. The basin defines the bottom of the reservoir compartment, designated generally by the reference numeral 25. Said compartment is separated from the burner space by partitions 26 that are mounted upon and rise from the burner plates 10 and 11 to a point adjacent the stove top where they have associated with them a horizontal wall 28 that defines the top of the reservoir compartment. It is essential that the reservoir compartment not only be shielded or insulated from the burner space, but that it be thoroughly ventilated, and this is accomplished through the spaces along the opposite sides of the fuel basin, best shown in Fig. 4, and through a large opening 30 in the back panel 4, shown as surrounded by an inwardly directed flange, and through holes 31 in the burner plates 10 and 11, where they are enclosed by the laterally extending rear portions of the partitions 26. Ventilating openings 33 and 34 are also formed in the forwardly extending portions of the partitions near their top and bottom edges, as appears from Figs. 3 and 5. Thus it will be seen that a fuel compartment is provided adjacent the rear of the stove that broadens out between the rear burners and has a relatively narrow front opening aligned with the space between the front oven burner and the adjacent front cooking burner.

The collapsible guide and support for the portable fuel reservoir, presently to be described, serves, when collapsed, as a closure for the open front of the reservoir compartment; and the entire space between the stove top and the assembly comprising the burner plates 10 and 11 and the member 12, and which may be termed the burner space, is adapted to be closed by a door 36 that is hinged at 37 to the stove structure so as to swing downwardly from normal closed position to a substantially horizontal position. Near its free edge the door is provided with a handle 38. As usual in stove structures of the kind to which the invention relates, spring means is employed for counterbalancing the door and holding it in closed position, but to avoid confusion the same is omitted from the drawings. A burner tray 40 is slidably supported beneath the burner plates and below the conduit 21 by guides 41 that are attached adjacent their ends to the front and rear parts of the stove frame.

Figure 5:
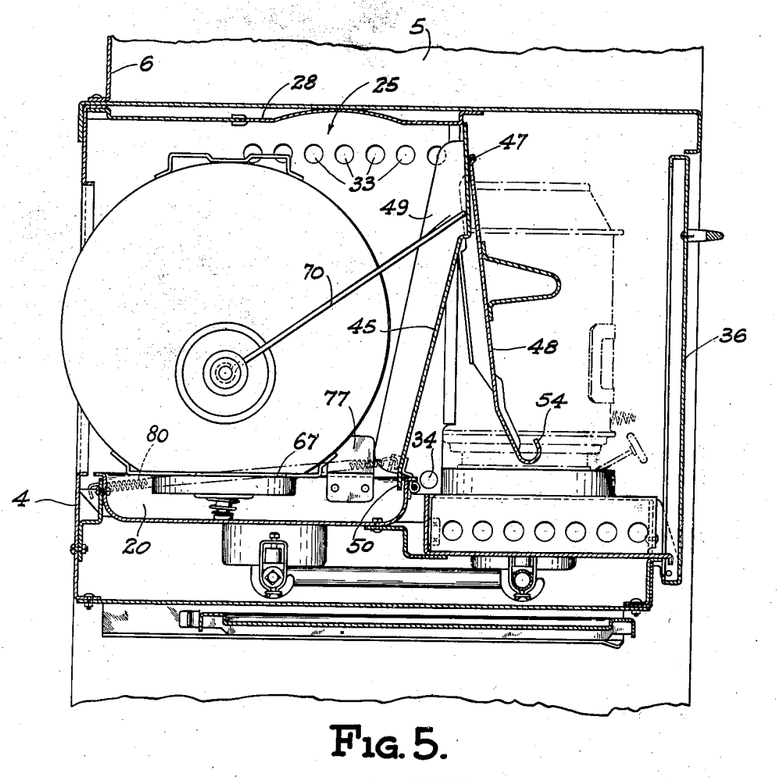
Fig. 5 is a view similar to Fig. 3 showing the door closed and the reservoir in operative position over the fuel basin and the collapsible guide and support in folded condition.

The inner section 45 of the collapsible or folding reservoir guide and support is pivotally connected at its inner end to the forward end of the basin 20 by a hinge 46; and similarly connected at 47 to the forward end of the section 45 is the outer section 48. The former section has side flanges 49, and at its inner end is provided with a lip 50 that extends rearwardly over the hinge into overlapping relation to the basin and serves to conduct any fuel that may be present on the reservoir support and guide into the basin when the former is collapsed or folded, as illustrated in Fig. 5. The outer section 48 has depending flanges 52 along its lateral edges that rest upon the door 36 when the latter is opened and when the guide and support is in extended condition as illustrated in Fig. 3. The free end of the section 48 is deflected slightly from the plane of its major portion and is curled over to provide a hand pull 54, the unit being stiffened in the region of its angularly related portions by ribs 55. Adjacent the overlapping outer end of the inner section 45, the outer section is provided with raised portions 56 that provide, in association with said overlapping end of the inner section, a level support for the portable fuel reservoir 60.

Figure 6:
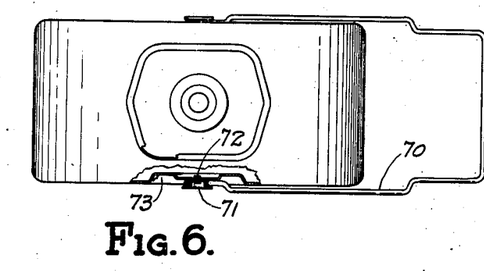
Fig. 6 is a plan view of the portable fuel reservoir.

The reservoir 60 is shown as consisting of a cylindrical vessel to the peripheral wall of which is welded or otherwise secured a base 61. Diametrically opposite the base, said peripheral wall is formed to provide a flat portion that may be considered the top of the reservoir. The top has a filling and discharge opening surrounded by a neck 62 to which is applied a cap 63 equipped with a valve 64 that is biased toward closed position by a spring 65 that surrounds the stem of the valve and is compressed between the cap 63 and a head 66. Surmounting the top of the reservoir is a member 67 including an upstanding flange 68 that surrounds the neck and is curved over and inwardly as shown at 69. This arrangement prevents any fuel that may drip from the neck from reaching the outer walls of the vessel. The reservoir is provided with a bail 70 whose ends are formed to provide eyes that encircle the neck portions of buttons 71 that are fastened, as by rivets 72 (Fig. 6) to depressed portions 73 of the circular walls of the reservoir. The axis on which the bail is pivoted is somewhat above the center of the vessel so that when the vessel is lifted by means of the bail it will hang in an upright position. This enables it to be readily placed on the guide and support in the position illustrated in Fig. 3 against a stop 75 carried by the outer section 48. When the reservoir is thus placed upon the guide and support it may be caused to roll over along the inner section 45 by simply urging it rearwardly by means of the bail 70, the reservoir being guided by the lateral flanges 49 of the inner section 45 to an inverted position over the basin 20. In this position the reservoir rests with its top squarely upon the sides of the basin and is prevented from shifting laterally as it arrives in inverted, operative position by the combined guides and stops 77 that are applied to the side walls of the basin 20 and extend laterally and upwardly therefrom. When the reservoir is in operative position, the valve 64 is lifted from its seat and thus opened against the tension of the spring 65 by the engagement of the headed outer end of the stem with the bottom of the basin.

After the reservoir is moved inwardly to inverted, operative position over the fuel basin, the bail 70 may be dropped and the outer end of the guide and support may then be lifted by means of the hand pull 54 so as to swing the unit upwardly on the hinge 46. Springs 80, whose forward ends are connected to ears 81 on the inner section 45 forwardly of the hinge 46 and whose rear hooked ends are anchored to the stove structure as by being engaged through holes in the burner plates 10 and 11, serve to swing the inner section 45 upwardly as soon as the unit has been lifted sufficiently to cause the strength of the springs 80 to overcome the weight of the unit. The section 45 is thus moved to and held in a position with its free end engaged with the forward end of the top wall 28 of the reservoir compartment, the outer section in the meantime swinging of its own weight toward a vertical position forwardly of the section 45, as illustrated in Fig. 5. During this action of the collapsible guide and support, the bail 70 rides upwardly along the section 45. When in folded condition, the guide and support serve as a double wall closure for the open front of the reservoir compartment 25 and shields the reservoir from heat of the burners reflected rearwardly by the door 36 when the latter is closed. It may be explained that the tension of the springs 80 may be adjusted by engagement of their hooked rear ends in different ones of the series of holes 82 in the burner plates 10 and 11 (Fig. 4).

It is apparent from the foregoing description that, when it is desired to replenish the fuel supply, the door 36 of the burner space may be swung down to horizontal position by means of the handle 38, suitable stop means (not shown, but common in stoves of this character) arresting movement of the door when it has attained horizontal position. The hand pull 54, occupying the position shown in Fig. 5, may now be grasped and pulled forwardly which will unfold the guide and support against the action of the springs 80 and straighten it out across the member 12 and over the door 36, and when thus extended its weight will cause it to remain at rest upon the door, as illustrated in Fig. 3. During the unfolding of the guide and support, the bail 70 gravitates to the position shown in dot-and-dash lines in Fig. 3 where it may be easily taken hold of and pulled forwardly. The reservoir will first slide along the top of the basin 20 until the member 67 engages the combined stops and guides 77, after which continued pull on the reservoir will cause it to roll over along the section 45 of the guide and support until it arrives in the upright position shown in full lines in Fig. 3. The reservoir may then be lifted and carried away for refilling.

The filled reservoir may then be placed upon the guide and support and, by means of the bail, rolled rearwardly therealong until it arrives in an inverted operative position over the basin 20. Contact of the stem of the valve 64 with the bottom of the reservoir will open the valve and fuel will flow into the basin until the liquid accumulated therein seals the outlet opening of the reservoir. Now, with the reservoir in place, the hand pull 54 may be grasped and the guide and support lifted sufficiently to reduce the gravitational action to less than that of the springs 80 whereupon said springs will collapse the guide and support to the position shown in Fig. 5, after which the door 36 may be closed.

As an alternative of the foregoing procedure, the door 36 may be lifted while the guide and support is in extended condition and as soon as the latter has been elevated sufficiently, the springs 80 will automatically collapse it as the door 36 continues to its closed position.

Figure 7:
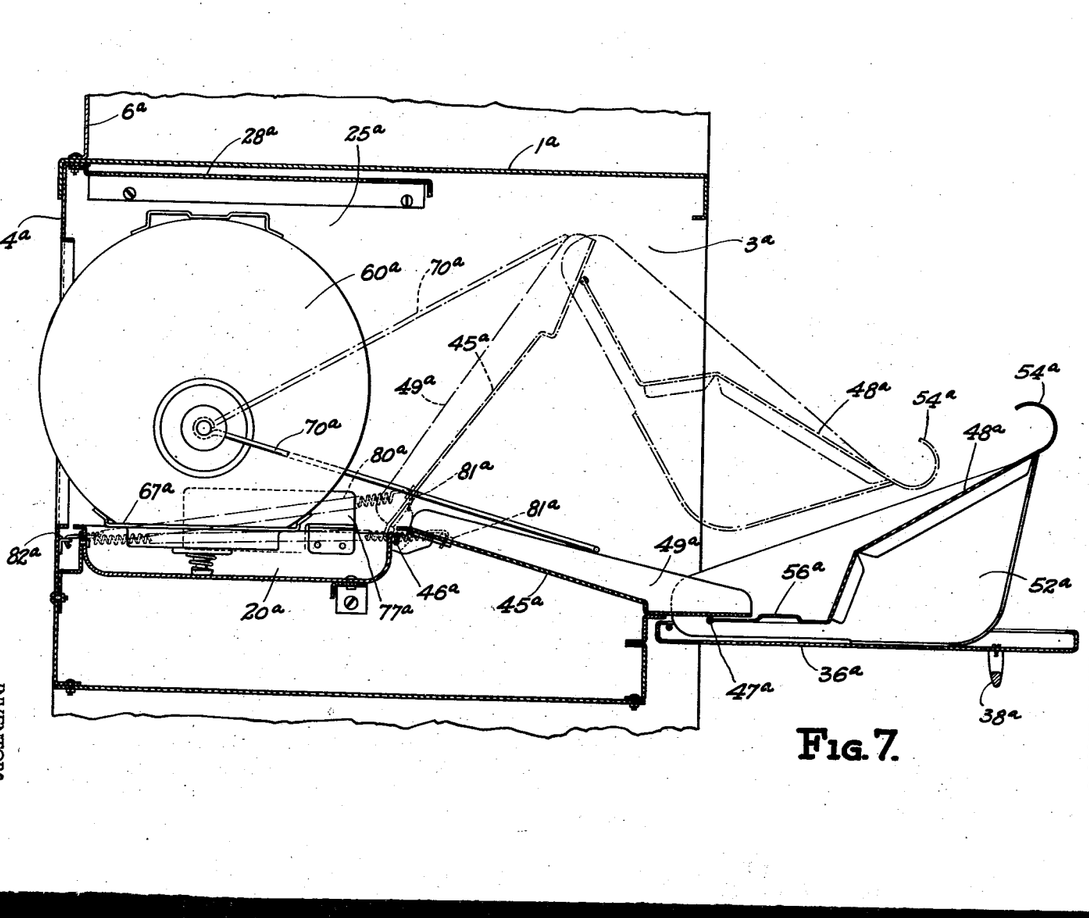
Figs. 7 and 8 are sectional views, similar to Figs. 3 and 5, respectively, showing a modified form of the invention.
Figures 8, 9:
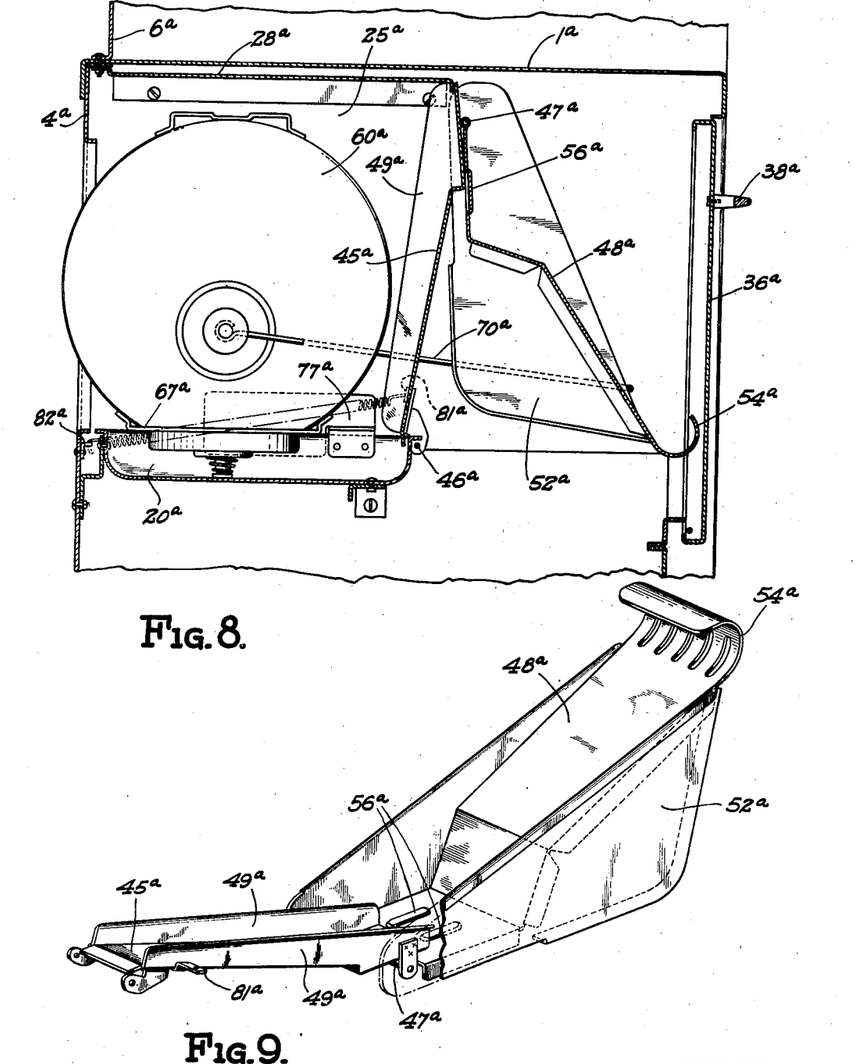
Fig. 9 is a perspective view of the collapsible guide and support of the modification shown in Figs. 7 and 8.

In Figs. 7 to 9, illustrating a modification of the invention, the stove top is designated 1$^a$, the end 3$^a$, the rear panel 4$^a$, the cabinet back 6$^a$, the fuel compartment 25$^a$, the top thereof 28$^a$, and the door for the burner space 36$^a$. In the present modification, the collapsible reservoir guide and support is composed of sections 45$^a$ and 48$^a$ that are hingedly connected together at 47$^a$, the unit being similarly connected at 46$^a$ to the forward end of the fuel basin 20$^a$. Springs similar to those described in connection with the former modification serve to swing the collapsible guide and support toward and retain it in folded condition, shown in Fig. 8, one of said springs being shown in the drawings where it is designated 80$^a$. Its forward end is attached to an ear 81$^a$ on the section 45$^a$ and its opposite end anchored to the rear panel 4$^a$ through the medium of a lug 82$^a$.

The reservoir 60$^a$ that is used in the present form of the invention differs from that of the first described form at least in respect to the bail. Here the bail is made considerably longer than in the former case and somewhat wider than the reservoir guide and support. When the parts are in the position illustrated in Fig. 8, the bail extends forwardly and embraces the collapsed guide and support and its central or grip portion extends across and is supported upon the section 48ª near the lower end thereof.

When it is desired to remove the reservoir 69ª, the door 36ª is swung downwardly by means of a handle 38ª to horizontal position, as shown in Fig. 7, and the hand pull 54ª is grasped and the guide and support extended to the full line position shown in the last mentioned view. During the latter part of this action, the inturned edge portions of the flanges 52ª ride upon the surface of the door 36ª and finally come to rest thereon, as shown. During the extension of the guide and support, the grip portion of the bail 79ª rides upwardly along the sides of the section 48ª and over the ends thereof onto the side flanges 49ª of the section 45ª, an intermediate position of the parts being illustrated in dot-and-dash lines in Fig. 7. In the final position of the bail, when the support and guide is extended, the grip portion reposes near the front of the stove in the position shown in full lines in Fig. 7. The bail may now be conveniently grasped, and the reservoir propelled forwardly with a sliding action along the basin 20ª until the member 67ª strikes the stop portions of the combined stops and guides 77ª after which the reservoir will tilt forwardly and roll over along the section 45ª of the guide and support, finally arriving in an upright position on the flat forward end of the section 45ª and on the raised portions 56ª of the section 48ª from where the reservoir may be lifted.

In replacing the reservoir, the foregoing operation is reversed, and in this connection it may be pointed out that the upwardly and outwardly inclined forward end of the section 48ª serves as a guide and stop for properly locating the reservoir in its outward upright position.

The stove frame associated wtih the form of the invention illustrated in Figs. 10 to 13 includes a top 1ᵇ, a rear panel 4ᵇ, a door 36ᵇ for the burner space, hinged at 37ᵇ to the stove structure and equipped near its free edge with a handle 38ᵇ. To accommodate itself to this form of the invention, the door 36ᵇ swings through substantially 180° to the downwardly hanging open position shown in Figs. 11, 12 and 13. The fuel basin 20ᵇ is supported in the rear portion of the frame the required distance below the top 1ᵇ to establish the fuel level in the distributing system and burners at the elevation indicated by the dotted line x in Fig. 10, the liquid fuel in the basin serving to seal the reservoir when it reaches this elevation.

Figure 10:
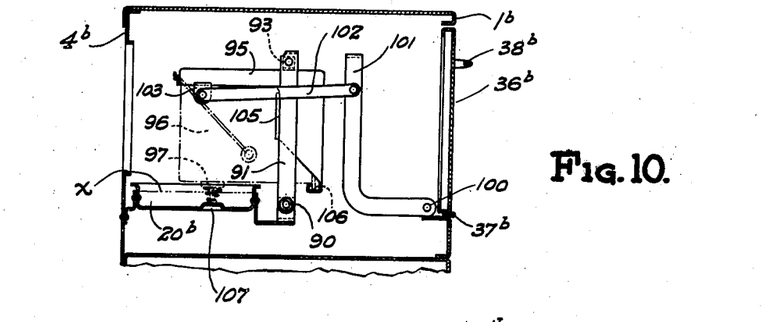
Fig. 10 is a schematic representation of a further modification, being in the nature of a vertical section through the stove, and showing the parts in operative condition with the reservoir inverted over the fuel basin.
Figure 11:
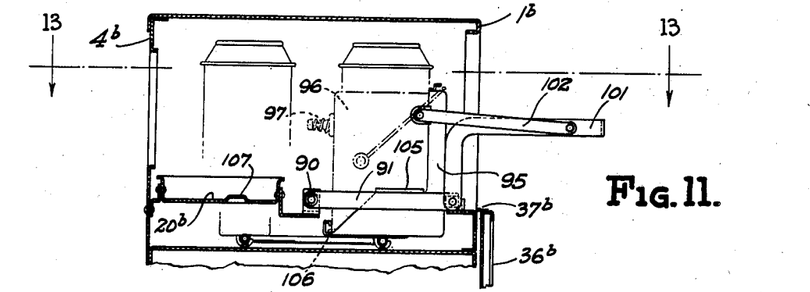
Figs. 11 and 12 are views similar in character to Fig. 10 showing, respectively, an intermediate position and the extreme outward position of the portable fuel reservoir and the means by which it is supported and guided between its extreme positions.
Figures 12, 13:
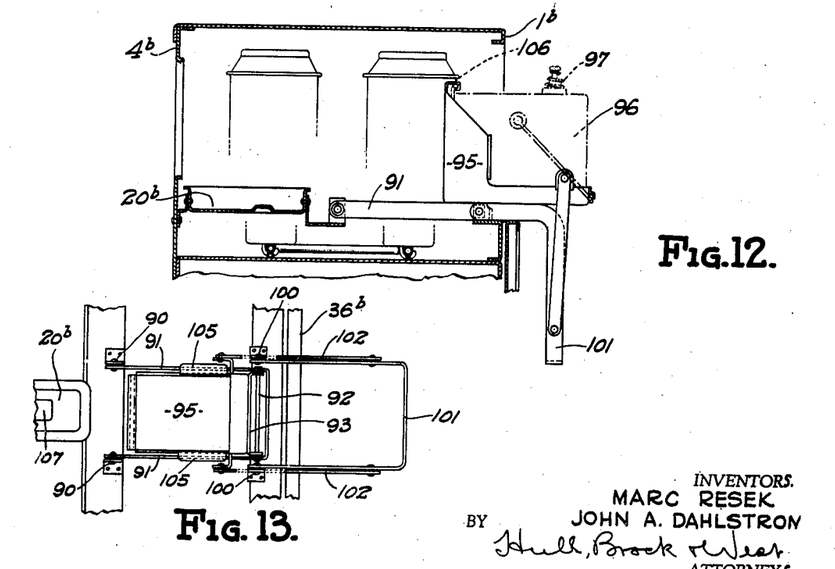
Fig. 13 is a section on the line 13—13 of Fig. 11.

Pivotally connected to the stove structure to swing on an axis designated 90 is a U-shaped member or yoke 91, and pivotally connected to the yoke adjacent its free end, through a pintle 92 and a member 93, is a carrier 95 for the rectangular reservoir 96, shown in dot and dash lines in Figs. 10 to 12. The reservoir has a filling and discharge opening surrounded by a neck 97 to which a valve equipped cap is applied, as in the cases of the previously described reservoirs.

Pivotally connected to the stove structure to swing on an axis 100 is a handle 101, the same being L-shaped in side elevation and U-shaped when viewed from the front of Fig. 10. Links 102 are pivoted at one of their ends to the handle 101 near the free end thereof, and at their opposite ends to laterally spaced ears 103 on the carrier 95. The carrier is provided with outwardly extending flanges 105 which, under certain conditions, engage the side members of the yoke 91, as will more fully appear when the operation of the mechanism is described. The free edge of the deeper end wall of the carrier 95 is formed to provide a channel 106, and when the reservoir 96 is sustained in inverted position over the basin 20ᵇ by the carrier 95, as shown in Fig. 10, a corner of the reservoir is engaged within the channel 106, while the diagonally opposite corner is confined against the more shallow end wall of the carrier. When the parts are in operative position as illustrated in Fig. 10, the valve of the reservoir is held open by contact of its stem with an elevated part 107 of the bottom wall of the basin 20ᵇ.

To remove the reservoir for filling purposes, the door 36ᵇ is opened and the handle 101 grasped and swung outwardly through the position illustrated in Fig. 11 to the position shown in Fig. 12. When the parts arrive at the position shown in Fig. 11, the outer end of the yoke 91 rests upon a front cross member of the stove frame and the flanges 105 of the carrier bear upon the top edges of the side members of the yoke. During the continued movement of the handle 101, the carrier 95, by reason of its connection with the handle through the links 102, swings about the pivotal axis defined by the pintle 92 to the position shown in Fig. 12. In this position the reservoir 96 rests within the carrier free from the channel 106 and may be conveniently lifted from the carrier and taken away for filling purposes. When a full reservoir is set within the carrier the handle 101 is grasped and swung upwardly and into the stove, thereby to shift the reservoir inwardly beneath the stove top with a progressive end-over-end action to its operative, inverted position over the basin 20ᵇ.

For the sake of clearness, and in order to simplify the drawings, we have omitted to show the burners in the views illustrating the second and third modifications. It will be understood, however, that the burner arrangement may be the same in connection with all forms of the invention, or it, with other general features of the stove—for example, the location of the oven—may be in accordance with any approved or standard design.

Having thus described our invention, what we claim is:

1. A cooking stove comprising a top, a plurality of burners arranged side by side beneath and adjacent the front of the top in properly spaced relation thereto, a compartment beneath the stove top to the rear of the vertical plane of the burners and having an opening facing the front of the stove, a fuel basin exposed to the interior of the compartment and having communicative connection with the burners, a portable reservoir having a discharge opening adjacent its top, and means arranged to receive the reservoir in an upright position adjacent the front of the stove and support and guide the same in a rearward, substantially horizontal, progressive end-over-end movement through the aforesaid opening to an inverted position in discharging relation to the basin.

2. A cooking stove comprising a top, a plurality of burners arranged side by side beneath and adjacent the front of the top in properly spaced relation thereto, a compartment beneath the stove top to the rear of the vertical plane of the burners and having an opening facing the front of the stove, burners rearwardly of said plane on opposite sides of the compartment, a fuel basin exposed to the interior of the compartment and having communicative connection with all burners, a portable reservoir having a discharge opening adjacent its top, and means arranged to receive the reservoir in an upright position adjacent the front of the stove and support and guide the same in a rearward, substantially horizontal, progressive end-over-end movement through the aforesaid opening to an inverted position in discharging relation to the basin.

3. In a liquid fuel stove of the class described, a frame structure including a top, a plurality of burners arranged side by side beneath the front portion of the top, a reservoir compartment beneath the rear portion of the top, a fuel basin exposed to the interior of said compartment and having communicative connection with the burners, a portable reservoir having a discharge opening at its top, and means adapted to receive the reservoir in an upright position adjacent the front of the stove structure and support and guide the same in a rearward substantially horizontal progressive end-over-end movement beneath the top to an inverted position over the basin.

4. In a liquid fuel stove of the class described, a frame structure including a top, a row of burners arranged lengthwise of the structure beneath the front portion of the top, a reservoir compartment rearwardly of said row of burners provided with a front opening to which access is had between adjacent burners, a fuel basin exposed to the interior of said compartment and having communicative connection with the burners, a portable reservoir provided with a discharge opening at its top, and means adapted to receive the reservoir in an upright position adjacent the front of the structure and support and guide the same in a rearward substantially horizontal progressive end-over-end movement through the aforesaid opening to an inverted position over the basin.

5. In a liquid fuel stove of the class described, a frame structure including a top, a row of burners spaced apart longitudinally of the structure beneath the front portion of the top, a reservoir compartment rearwardly of said row and having a front opening accessible between adjacent ones of said burners, burners spaced laterally of the compartment in staggered relation to the former burners, a fuel basin exposed to the interior of the compartment and having communicative connection with the burners, a portable fuel reservoir provided with a discharge opening at its top, and means adapted to receive the reservoir in an upright position adjacent the front of the structure and support and guide the same in a rearward substantially horizontal progressive end-over-end movement through said opening to an inverted position over the basin.

6. In a liquid fuel stove of the class described, a frame structure including a top, a plurality of burners arranged side by side beneath the front portion of the top, a reservoir compartment beneath the rear of the top, a fuel basin exposed to the interior of said compartment and having communicative connection with the burners, the compartment having a front opening available through the space alongside a burner, a portable reservoir having a discharge opening at its top, and means adapted to receive the reservoir in an upright position adjacent the front of the structure and support and guide the reservoir in a rearward substantially horizontal progressive end-over-end movement through said opening to an inverted position over the basin, said means being shiftable from operative to inoperative position in the latter of which it serves as a closure for said opening.

7. In a liquid fuel stove of the class described, a frame structure including a top, a plurality of burners arranged side by side beneath the front portion of the top, a reservoir compartment beneath the rear of the top, a fuel basin exposed to the interior of said compartment and having communicative connection with the burners, the compartment having a front opening available through the space alongside a burner, a guide and support hinged to the structure adjacent the bottom of said opening and shiftable between a substantially horizontal operative position and an upstanding inoperative position, and a portable fuel reservoir having a discharge opening at its top and being adapted to be placed in an upright position on the front of said guide and support when the latter is in operative position and to be moved rearwardly thereon with a progressive end-over-end movement to an inverted position over the basin, said guide and support serving when in inoperative position as a closure for said opening.

8. In a liquid fuel stove of the class described, a frame structure including a top, a plurality of burners arranged side by side beneath the front portion of the top, a reservoir compartment beneath the rear of the top, a fuel basin exposed to the interior of said compartment and having communicative connection with the burners, the compartment having a front opening available through the space alongside a burner, a collapsible guide and support hinged to the structure adjacent the bottom of said opening and adapted to be shifted between an inoperative position wherein it serves as a closure for said opening and an operative position in which it extends forwardly from the compartment, and a portable fuel reservoir having a discharge opening at its top and adapted to be placed upon said guide and support in an upright position adjacent the front of the structure and to be moved rearwardly thereon with a progressive end-over-end movement through said opening to an inverted position over the basin.

9. In a liquid fuel stove of the class described, a frame structure including a top, a plurality of burners arranged side by side beneath the front portion of the top, a reservoir compartment beneath the rear of the top, a fuel basin exposed to the interior of said compartment and having communicative connection with the burners, the compartment having a front opening available through the space alongside a burner, a collapsible guide and support hinged to the structure adjacent the bottom of said opening and adapted to be shifted between an inoperative position wherein it serves as a closure for said opening and an operative position in which it extends forwardly from the compartment, and a portable fuel reservoir having a discharge opening at its top and adapted to be placed upon said guide and support in an upright position adjacent the front of the structure and to be moved rearwardly thereon with a progressive end-over-end movement through said opening to an inverted position over the basin, said guide and support being biased toward one or the other of its extreme positions from an intermediate point in its range of movement.

10. In a liquid fuel stove of the class described, a frame structure including a top, a plurality of burners arranged side by side beneath the front portion of the top, a reservoir compartment beneath the rear of the top, a fuel basin exposed to the interior of said compartment and having communicative connection with the burners, the compartment having a front opening available through the space alongside a burner, a collapsible guide and support hinged to the structure adjacent the bottom of the aforesaid opening and adapted to be shifted between an inoperative position wherein it serves as a closure for said opening and an operative position in which it extends forwardly from the compartment, a portable fuel reservoir having a discharge opening at its top and adapted to be placed upon said guide and support in an upright position and to be moved rearwardly thereon with a progressive end-over-end movement through said opening to an inverted position over the basin, said guide and support being biased toward one or the other of its extreme positions from an intermediate point in its range of movement, and a door pivoted at its lower edge to the stove structure to swing between a vertical position in which it closes the front of the space occupied by the burners and a horizontal position, the aforesaid guide and support extending over the door in proximity thereto when the former is in operative position and the latter is in horizontal position.

11. In a liquid fuel stove, the combination of one or more burners, a fuel basin, communicative connections between the basin and said burner or burners, a support adjacent the basin, and a reservoir having a discharge opening and a convexedly curved peripheral portion, said reservoir being adapted to be rolled on said portion along the support from an upright position wherein the discharge opening is elevated to an inverted position over the basin with said opening in discharging relation thereto.

12. In a liquid fuel stove, the combination of one or more burners, a fuel basin having communicative connection with said burner or burners, a reservoir support adjacent the basin, and a reservoir having a discharge opening and adapted to be placed on said support with said opening elevated and, by a progressive end-over-end action without appreciable rise, to be disposed in an inverted position over the basin with said opening in discharging relation thereto.

13. In a liquid fuel stove, the combination of one or more burners, a fuel basin adjacent the rear of the stove, communicative connections between the basin and said burner or burners, a collapsible support consisting of hingedly connected sections, one end of one section being pivotally supported adjacent the front of the basin, the support being adapted to be extended from a collapsed condition to operative position with respect to the basin, and an element comprising a reservoir having a discharge opening and provided with a convexedly curved portion, said element being adapted to be rolled on said portion along the support between an upright position adjacent the front of the stove wherein the discharge opening is elevated and an inverted position over the basin with said opening in discharging relation thereto.

14. In a liquid fuel stove, the combination of one or more burners, a fuel basin, communicative connections between the basin and said burner or burners, a collapsible support consisting of hingedly connected sections, one end of one section being pivotally supported adjacent a side of the basin, the support being adapted to be extended from a collapsed condition to operative position with respect to the basin, and an element comprising a reservoir having a discharge opening and provided with a convexedly curved portion, said element being adapted to be rolled on said portion along the support from an upright position wherein the discharge opening is elevated to an inverted position over the basin with said opening in discharging relation thereto, the said guide being biased in one direction from a point in its range of movement toward collapsed condition and in the other direction from said point to operative position.

15. In a liquid fuel stove, the combination of one or more burners, a fuel basin, communicative connections between the basin and said burner or burners, a support pivotally supported at one end adjacent the basin and adapted to be swung from operative position wherein it extends generally laterally from the basin to a position at substantially right angles to the former position, and an element comprising a reservoir having a discharge opening and provided with a rocker portion, said element being adapted to be rolled on said rocker portion along the support when the latter is in operative position from an upright position of the reservoir wherein its discharge opening is elevated to an inverted position over the basin with said opening in discharging relation thereto.

16. In a liquid fuel stove, the combination of one or more burners, a fuel basin, communicative connections between the basin and said burner or burners, a support pivotally sustained at one end adjacent the basin and adapted to be swung from operative position wherein it extends generally laterally from the basin to inoperative position at substantially right angles to the former position, and an element comprising a reservoir having a discharge opening and provided with a rocker portion, said element being adapted to be rolled on said rocker portion along the support when the latter is in operative position from an upright position of the reservoir wherein its discharge opening is elevated to an inverted position over the basin with said opening in discharging relation thereto, and means tending to maintain the support in inoperative position.

17. In a liquid fuel stove, the combination of one or more burners, a fuel basin, communicative connections between the basin and said burner or burners, a support adjacent the basin, a reservoir having a discharge opening and a convexedly curved peripheral portion on which it is adapted to be rocked along the support from an upright position wherein the discharge opening is elevated to an inverted position over the basin with said opening in discharging relation thereto, and a stop associated with the support for properly positioning the reservoir thereon when the latter is in upright position.

18. In a liquid fuel stove, the combination of one or more burners, a fuel basin, communicative connections between the basin and said burner or burners, a support adjacent the basin, a reservoir having a discharge opening and a convexedly curved peripheral portion on which it is adapted to be rocked along the support from an upright postion wherein the discharge opening is elevated to an inverted position over the basin with said opening in discharging relation to the basin, means by which the reservoir may be propelled along the support, and stop means adjacent the basin wherewith the reservoir is adapted to engage to impart rocking action to the reservoir when retracted by said means along the support to upright position.

19. In a liquid fuel stove, the combination of one or more burners, a fuel basin, communicative connections between the basin and said burner or burners, a support adjacent the basin, and a generally cylindrical reservoir having a base on its periphery and a discharge opening substantially diametrically opposite said base, said reservoir being adapted to be rolled along the support from an upright position to an inverted position over the basin with said opening in discharging relation thereto.

20. In a liquid fuel stove, the combination of one or more burners, a fuel basin, communicative connections between the basin and said burner or burners, a support adjacent the basin, a generally cylindrical reservoir having a base on its periphery and a discharge opening substantially diametrically opposite said base, said reservoir being adapted to be rolled along the support from an upright position to an inverted position over the basin with said opening in discharging relation thereto, and means on the reservoir for propelling it along the support.

21. In a liquid fuel stove, the combination of one or more burners, a fuel basin, communicative connections between the basin and said burner or burners, a support adjacent the basin, a generally cylindrical reservoir having a base on its periphery and a discharge opening substantially diametrically opposite said base, said reservoir being adapted to be rolled along the support from an upright position to an inverted position over the basin with said opening in discharging relation to the basin, and a bail whose ends are pivotally connected to the end walls of the reservoir on an axis nearer the discharge opening than the base.

22. In a liquid fuel stove, the combination of one or more burners, a fuel basin having communicative connection therewith, a reservoir guide and support movably sustained adjacent the basin and shiftable between operative and inoperative positions, a portable fuel reservoir having a discharge opening at its top and being of a shape to roll along the guide and support between an upright position remote from the basin and an inverted position over the basin, the reservoir having a bail that rests upon the guide and support and adjusts itself to the manipulations thereof, the bail embracing the guide and support when the latter is in inoperative position.

23. In a liquid fuel stove, the combination of one or more burners, a fuel basin having communicative connection with said burner or burners, a collapsible guide and support consisting of two sections, one section hingedly supported adjacent the basin to swing between a substantially horizontal position and a substantially vertical position, and the other section pivoted to the first section adjacent the free end thereof to fold between a position wherein it constitutes an extension of the first section when the latter is substantially horizontal and a hanging position when the first section is substantially vertical, a reservoir having a discharge opening at its top and being of a shape to roll along the guide and support when the sections are substantially horizontal between an upright position thereon remote from the basin and an inverted position over the basin, the reservoir having a pivoted bail adapted to rest upon the guide and support and to ride over the same during manipulation thereof between collapsed and extended positions.

24. In a liquid fuel stove, the combination of one or more burners, a fuel basin, communicative connections between the basin and said burner or burners, a support adjacent the basin, and a reservoir having a base and a discharge opening substantially opposite said base and a rocker portion between the base and said opening, said reservoir being adapted to be turned over on its rocker portion along the support to a position over the basin with said opening in discharging relation thereto.

25. In a liquid fuel stove of the class described, a frame structure including a top, a reservoir compartment beneath the rear portion of the top, a fuel basin exposed to the interior of said compartment, a portable reservoir having a discharge opening at its top, said reservoir being shaped so that it is capable of being rolled to an inverted position with the discharge opening directed substantially downwardly, and means adapted to receive the reservoir in an upright position adjacent the front of the stove structure and support and guide the same as it is rolled beneath the top to an inverted position over the basin.

26. A liquid fuel reservoir consisting of a substantially cylindrical vessel having a discharge opening in its peripheral wall, a member applied to said wall and surrounding said opening and formed to arrest liquid draining away from the opening toward the body of the vessel, and a bail pivoted to the side walls of the vessel on an axis eccentric thereof and so disposed with respect to said discharge opening that when the vessel is sustained by the bail it will automatically assume a position by gravity with said opening in elevated position.

27. In a liquid fuel stove, in combination with the stove structure, a burner supported thereby, a housing enclosing a reservoir compartment, a basin at the bottom of said compartment, communicative connections between the basin and burner, the housing having an open side through which access is had to said compartment, a door hinged to the housing on a substantially horizontal axis adjacent the bottom of said open side and adapted to be swung between a closed position and a substantially horizontal open position, a reservoir having an opening and adapted to be placed upon said door when the latter is open in an upright position with said opening elevated, guiding means along which the reservoir is shifted laterally from said door through the open side of the housing with a progressive end-over-end movement to an inverted position wherein said opening is in discharging relation to the basin.

MARC RESEK.
JOHN A. DAHLSTROM.